April 16, 1968     J. W. WARNER     3,377,805
DEVICE TO ASSIST FISH TO TRAVEL PAST OBSTACLES IN WATERWAYS
Filed Sept. 21, 1965     6 Sheets-Sheet 1

Inventor
Joseph William Warner

Stevens, Davis, Miller & Mosher
Attorneys

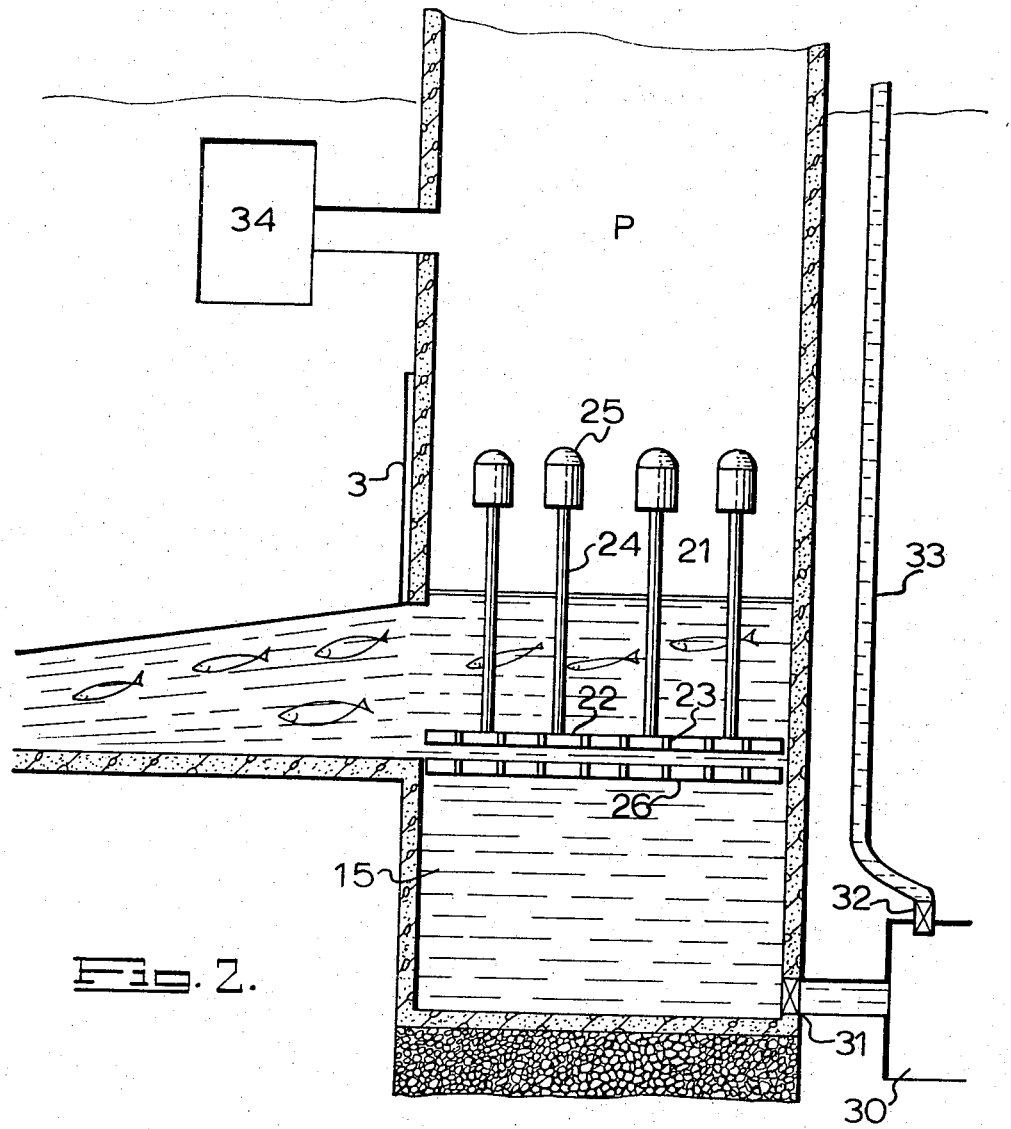

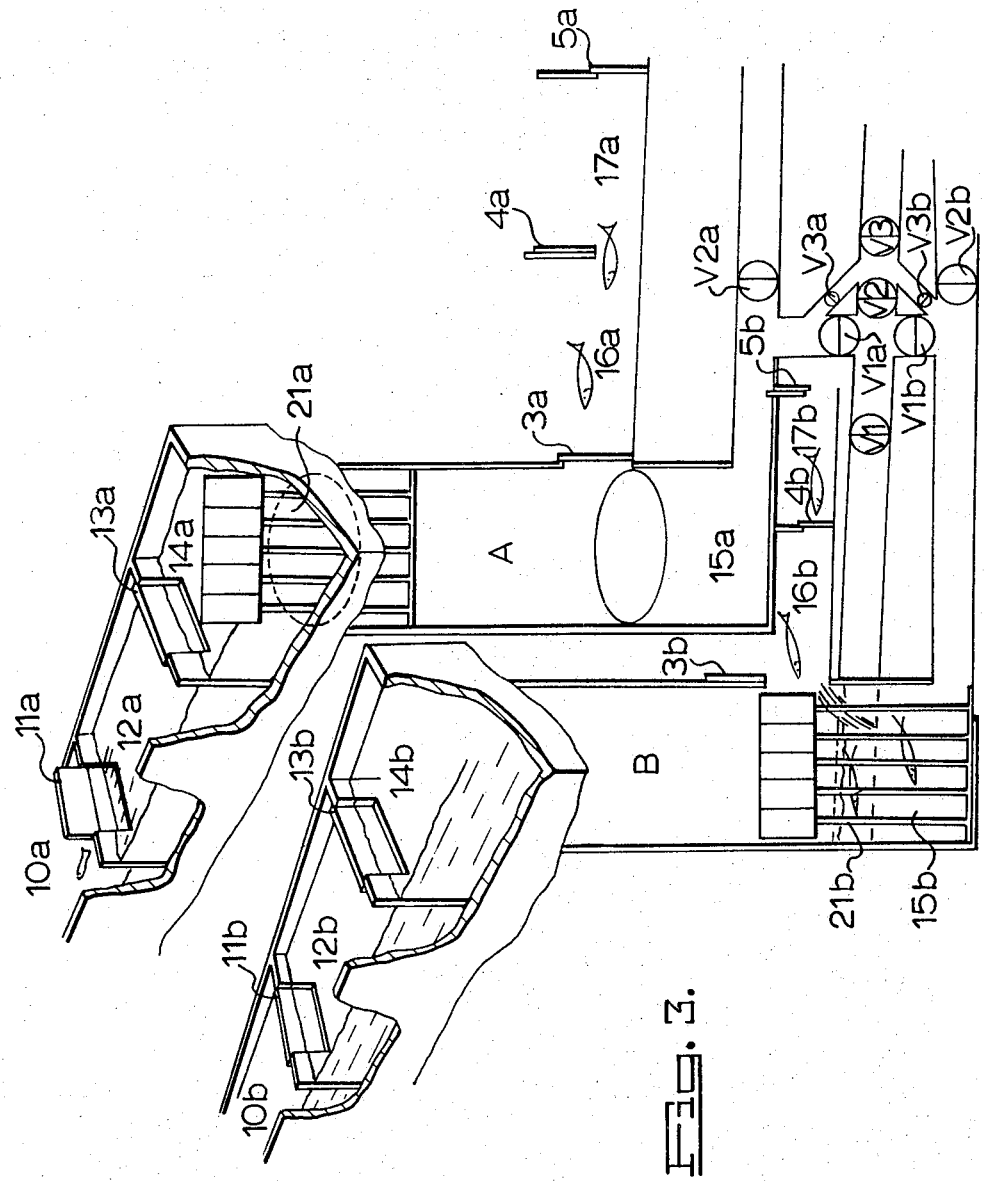

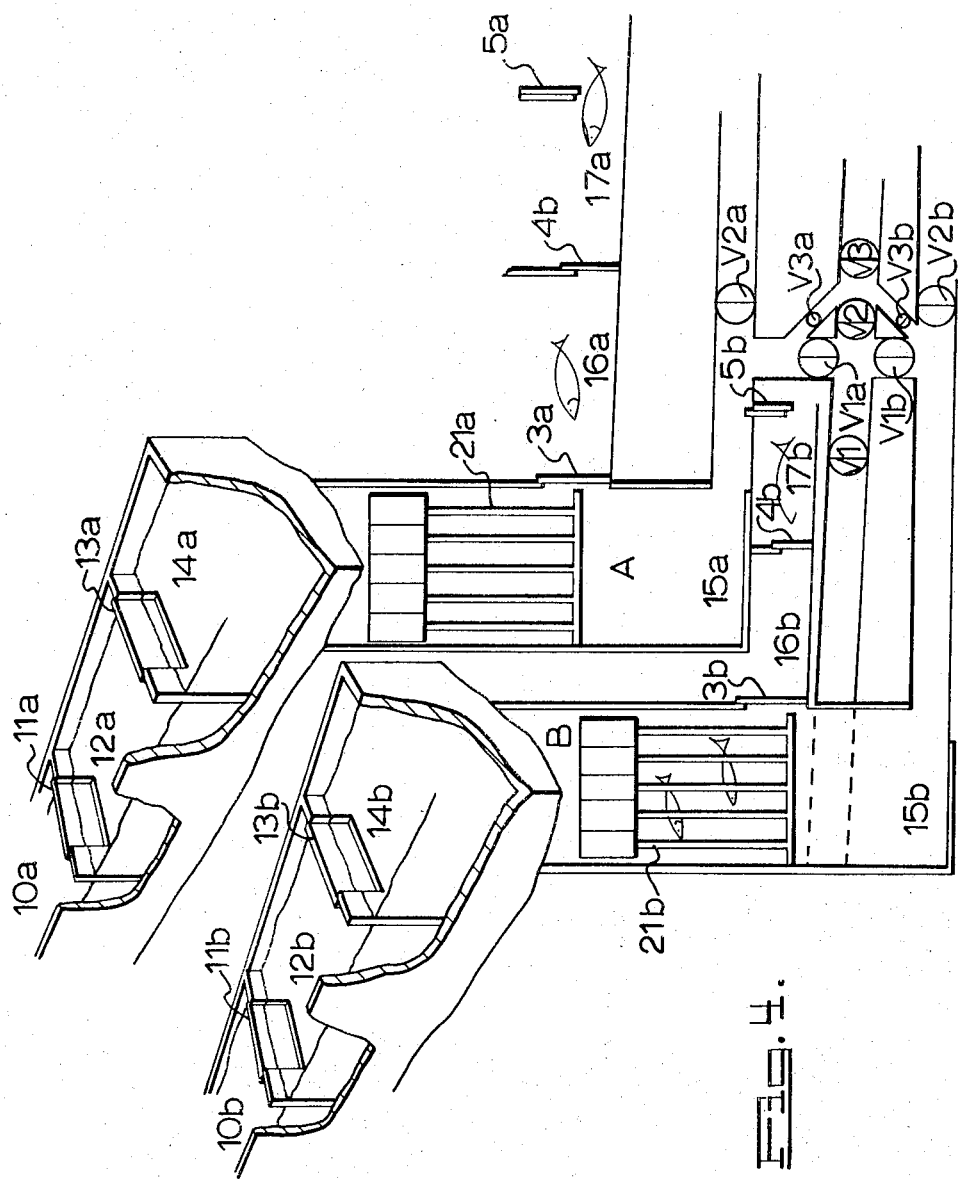

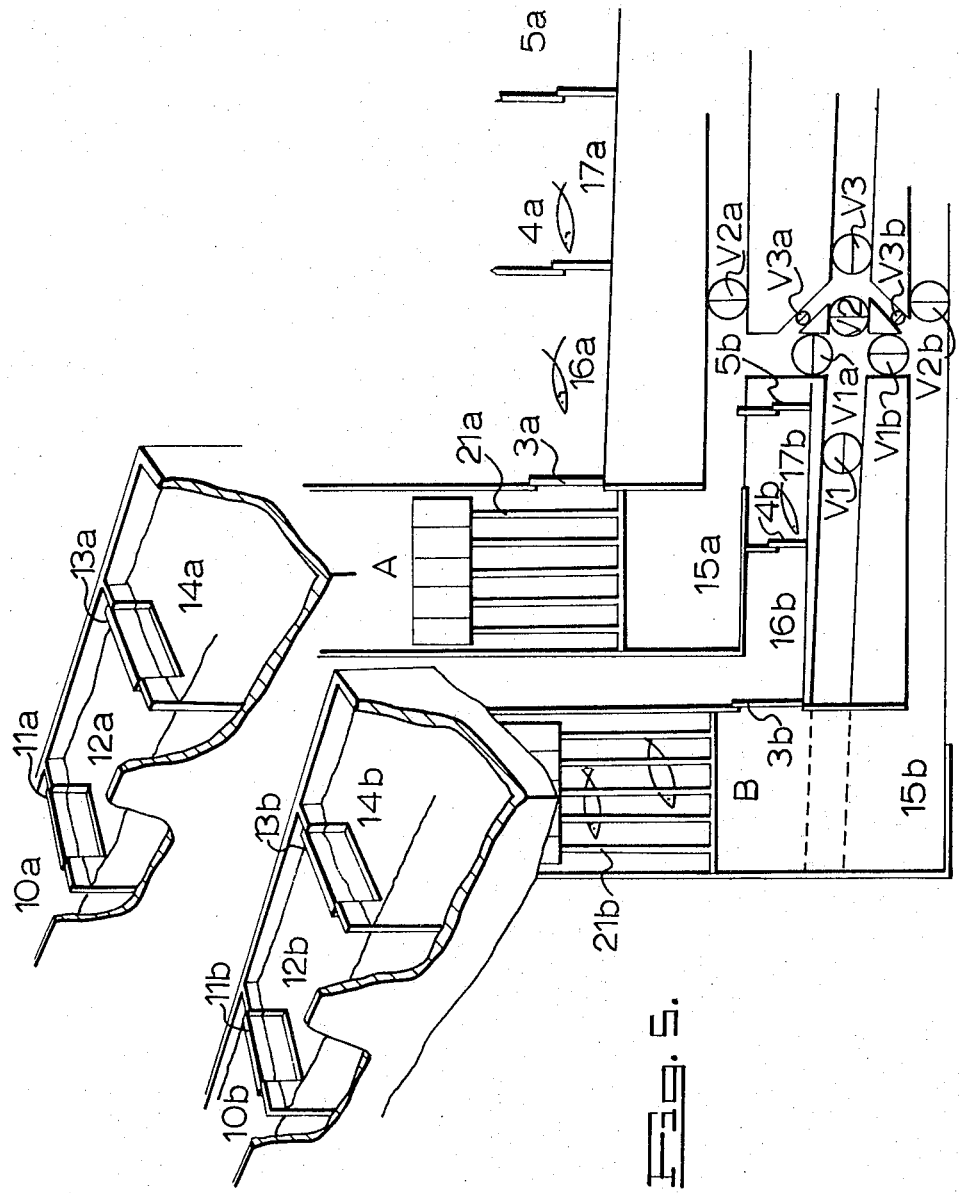

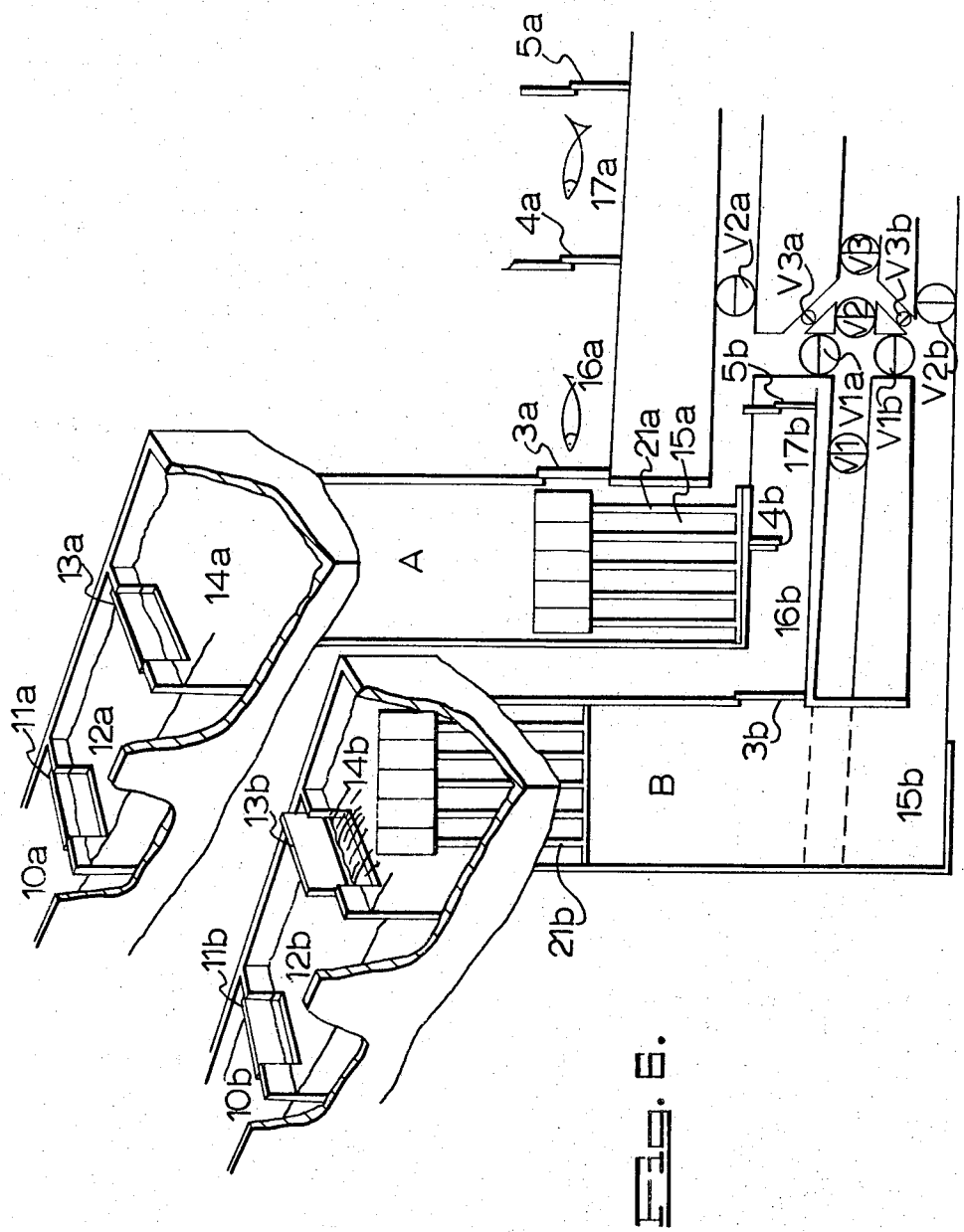

United States Patent Office 3,377,805
Patented Apr. 16, 1968

3,377,805
DEVICE TO ASSIST FISH TO TRAVEL PAST
OBSTACLES IN WATERWAYS
Joseph William Warner, 13751 14th Ave.,
Haney, British Columbia, Canada
Filed Sept. 21, 1965, Ser. No. 488,919
12 Claims. (Cl. 61—21)

ABSTRACT OF THE DISCLOSURE

A system for assisting fish to circumnavigate obstructions, such as dams in rivers or streams, which impede or block their migration route to their spawning areas. The fish are diverted from the main stream of water into a series of locks terminating in a passageway containing a semi-buoyant cage which acts to raise or lower the fish by altering the level of the water in the passageway. The fish, on attaining the new level, are released through a series of locks to continue their migration.

This invention relates to a novel method and device for safely assisting fish to overcome and circumnavigate obstructions in rivers and streams. More particularly this invention is concerned with safely assisting fish over and around obstacles which impede or block their migration route from the ocean to the spawning areas and from spawning grounds or areas to the ocean.

The type of fish with which this invention is concerned is primarily the anadromous fish, such as the salmon, which spend the greater part of their lives at sea and return to fresh water to spawn. During this migratory spawning period, literally millions of these fish enter the fresh water coastal rivers and start their journey upriver towards the quieter streams and tributaries. In attempting to go up the river, the fish encounter many natural hazards impeding their progress such as rock slides and natural waterfalls. With the demand for more and more electrical power and the need for water conservation, man-made obstacles in the form of hydroelectric power developments and dams are becoming more plentiful on the rivers used by these fish. Because of the increased efficiency of the fishing industry coupled with the many obstacles blocking the fish from the spawning areas, these fish are slowly becoming more depleted. In order to attempt to maintain good yields of this type of fish it is necessary to allow the mature fish access to the spawning areas and also to permit the young spawn to escape to the seas and oceans.

Prior to this invention, by-passes in the form of fish ladders or fish-passes have been employed to overcome such obstacles as dams. These ladders and passes, usually comprising a series of pools of water constructed in the form of steps, have limitations. They are costly to install and must be laid out on a gradual rise, each step limited to the height that the fish are able to naturally overcome. These types of by-passes also require diverting part of the waterflow thereby losing a percentage of the total possible hydro development. In cases of very rugged terrain it is, at times not practical to install these known types of systems and the river is made impassable to the fish. Under certain circumstances, trucks are at times used to transport fish around obstacles wherein they have been trapped but this again is a very costly and time consuming manoeuvre.

Thus, an object of the present invention is the provision of a method and means for conveying fish.

A further object of the present invention is the provision of a means for assisting fish to overcome obstacles in a river.

Another object of the present invention is the provision of a means for conveying fish from one level to a higher level and for conveying fish from a higher level to a lower level.

A still further object of the present invention is the provision of a system for safely assisting mature fish over an obstruction on their way to the spawning ground and for assisting the young fish safely around an obstruction on their way to the sea or ocean.

The present invention contemplates a method of conveying or transferring live fish which comprises confining the fish in a cage within a generally vertical passageway and altering the water level within the passageway thereby raising or lowering the cage. The cage device may comprise a screen through which water may freely pass but does not allow the confined fish to escape, rods extending upwardly from the screen and buoyant means attached to the top of the rods. The buoyant means may be of wood or foamed plastic or other floatable material. The cage device is always almost totally submerged in the column of water in the passageway, the buoyant means acting to maintain the cage proper just below the surface of the water. The cage and passageway may be of any shape, however, a cylindrical cage within a circular passageway is preferred.

The fish upward bound to the spawning area are diverted by means of an electronic screen, or other similarly known device for this purpose, from the main channel of a river into a waterway or canal system running parallel to the flow of the river. The fish enter a series of gates and are eventually confined in the cage device positioned within a generally vertical passageway or conduit. As the water level in the passageway is raised, the cage device, with the confined fish, is conveyed by the buoyant means in the safe upper limits of the column of water in the passageway. The cage containing fish is raised to the desired height and by means of various control gates and valves, the fish are discharged into a waterway or canal at the upper level which directs the fish back into the main channel of the river to continue to the spawning area.

The small fish on their downward journey are similarly diverted from the main channel by an electronic screen, or like device, into a waterway or canal system at the upper level of the obstruction. By proper operation of gates and valves these fish are directed into the cage device positioned in a generally vertical passageway. As the water is drained from the passageway, the cage containing the fish is lowered to an appropriate level. At this level the fish are released from the passageway and cage device, directed through a waterway back into the main channel of the river to continue their way downstream.

The invention will appear more clearly from the following detailed description when taken in conjunction with the accompanying drawings, which show, by way of example, preferred embodiments of the inventive concept.

Referring to the drawings:

FIGURE 2 illustrates a schematic, cross-sectional view of one form of the conveying device.

FIGURES 3 to 6 illustrate sequentially a schematic dual system including valving arrangements of another form of the conveying device.

Figure 1:
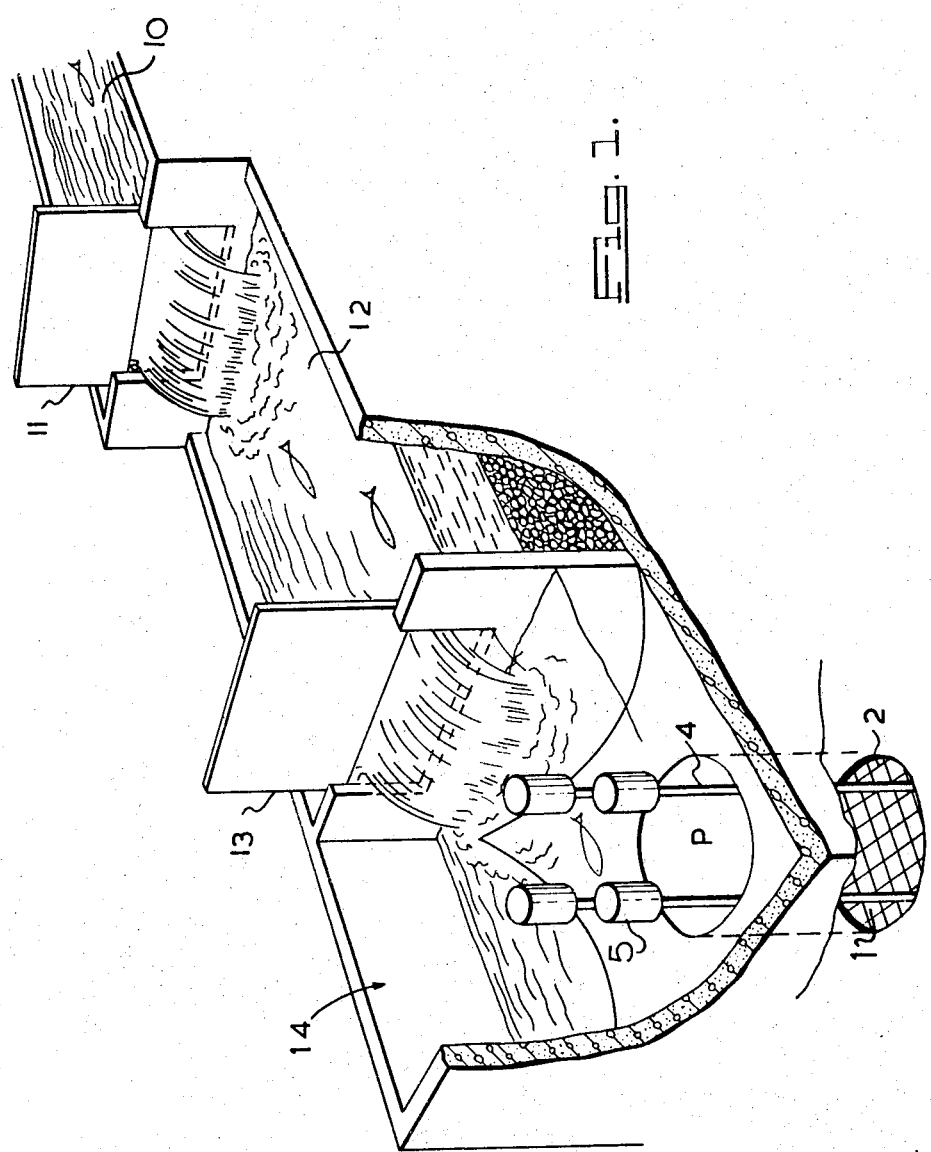
FIGURE 1 illustrates a schematic, perspective plan view, partially broken away, of the upper level of the conveying device.

The fish, either above or below the obstacle, are diverted by means of an electronic screen or other known similar device, not shown, from the main channel of the river to one side of the stream and enter a fishway or canal running parallel to the river. The fishway may comprise a series of locks controlled by weir gates. With reference to FIG. 1, weir gate 11 is opened allowing the fish which have been diverted from the river into the fishway 10 and to enter the lock indicated at 12. After a certain amount of fish have accumulated in lock 12, weir gate 11 is closed sealing off the fishway 10. Weir gate 13, which has been previously closed, is now opened allowing water and fish into the loading area 14. The area 14, as shown in FIG. 1, is rectangularly shaped with a downwardly sloping floor ending in centrally located passageway P. Positioned within the passageway P is the cage device, indicated generally at 1, having a screen mesh 2, rods 4 and buoyant means 5. As water enters the loading area the cage device rises due to the buoyant means attached to the top thereof. The cage is of sufficient length that at the maximum water level in the loading area the cage does not completely clear the end of the passageway and the screen portion of the cage remains within the passageway to prevent the fish from escaping down the passageway. When the fish in lock 12 have entered the loading area 14, weir gate 13 is closed. It will be noted that lock 12 is not completely drained and sufficient water remains for any fish trapped between the weir gates. The passageway P is slowly drained lowering the water level in the loading area. The fish in the loading area are forced into the cage device as the level of the water recedes due to the sloping floor in the loading area.

As shown in FIG. 2, the level of the water in passageway P is lowered by the opening of control valve 30 and valve 31. The cage device, indicated generally at 21, containing the fish operates within the passageway or conduit P. The cage comprises a screen composed of bars 22 with openings 23 having upwardly extending rods 24 attached thereto. Affixed to the top of the rods 24 are buoyant means 25 which maintains the cage device in an almost completely submerged condition just below the level of the water. The screen at the bottom of the cage is of such mesh that the water may easily flow but through which the fish cannot pass. The rods 24 are spaced as to allow the fish free movement into and out of the cage at the charging and discharging locations.

As the water level in the passageway P is lowered, the cage device containing the fish descends. The buoyant means 25 causes the cage to be at all times near the surface of the level of water thus, the fish being conveyed are not subjected to undue water pressures. A screen device, 26, stops further descent of the cage and valves 30 and 31 are closed to maintain a safe water level for the fish in the cage. Gate 3 is then opened allowing the fish to escape into a lock or fishway system, not shown, which directs the fish back into the main channel of the stream at the lower level. When the cage has been completely discharged of fish, gate 3 is closed. The stop screen 26, which may be hinged at one side and hydraulically operated, is lowered allowing the cage 21 to settle into well 15 located at the bottom of passageway P. The passageway P may then be further drained through valves 30 and 31.

Although the operation has been described in conjunction with the lowering of fish, the same system, by proper control of the water level, may be used to raise the fish over an obstruction. With the cage 21 in the well 15 of passageway P, gate 3 is opened and water and fish empty into the cage device. When a sufficient quantity of fish have entered the cage positioned in the well, gate 3 is closed and control valve 30 and valves 31 and 32 are opened allowing water from an upper water supply to flow by gravity through line 33 to fill passageway P. Cage 21, containing the fish, is raised by the buoyant means 25 attached to the top of the cage through the passageway P as the water level rises. As the gravity water feed is not sufficient to raise the cage to the top of the passageway, valves 30, 31 and 32 are closed and valve 34 connected to an external pressure system is opened to supply the additionally needed water to complete the operation. The cage 21 rises to the top of the passageway P and into area 14, of FIG. 1. The fish freely escape the cage through the rods 24 into this area. Weir gate 13 is raised allowing the fish entrance into the lock area 12 and thence through gate 11 and waterway 10 they re-enter the stream completely circumnavigating the obstruction.

The system as described, may be installed, in conjunction with an obstruction such as a dam, on the side of a river. Such a system allows the fish to freely and safely circumnavigate the obstacle. A dual system, as shown in FIGURES 3 to 6, may also be installed in which the various gates and valves to control the flow of water and the movement of the fish may be operated automatically or electronically.

Attention is drawn to FIGS. 3 to 6 where it is noted that the same reference numerals are used on these drawings to identify similar parts of the apparatus. As indicated by the drawings, the two systems are preferably installed in close proximity to each other at one side of a dam or obstacle. A generally vertical passageway, indicated as A, terminates at the upper end within area 14a as previously described in conjunction with FIG. 1. Weir gate 13a controls the flow of water and the movement of the fish from the area 14a to lock area 12a. Weir gate 11a further controls the water and fish from area 12a to waterway or canal 10a at the upper level. In a similar manner, gates 3a, 4a and 5a control the movement of the fish from a waterway or canal at the lower level, not shown, leading up to gate 5a and into holding areas 17a and 16a. The passageway A terminates at the lower end in walls 15a. Valves V1a, V2a and V3a control the level of water within the passageway A to operate the cage device 21a. The other half of the system about the passageway indicated at B is similar in every respect to the above described system. Valves V1b, V2b and V3b control the level of water within the passageway B to raise and lower the cage device 21b.

The following description more specifically outlines the operation of the dual system. With reference to FIG. 3, control valves V1a, V2a and V3a and gate 3a are in a closed position to maintain water in the well 15a and the passageway A thereby establishing the semi-buoyant cage 21a in the unloading position in the area 14a. Weir gates 13a and 11a are opened to allow the fish to escape through areas 12a and waterway or canal 10a and thence to the main upper channel of the stream. With gate 5a closed, fish, which have been diverted from the lower main channel of the river through a waterway, not shown, are trapped in holding area 16a and 17a connected by gate 4a.

Weir gates 11b and 13b are closed maintaining the waterway 10b and area 12b sealed. Area 14b and main passageway B are devoid of water. Gate 3b is opened, allowing the fish, trapped in the holding or lock area 16b between gates 3b and 4b, to be loaded into the cage device 21b positioned in the well 15b at the bottom of passageway B. Gate 5b, meanwhile, is opened to accept fish, which have been diverted from the lower main channel of the river through a waterway into a holding area 17b. Valves V1b, V2b and V3b are closed to maintain sufficient water level in well 15b for the fish transferred from area 16b.

With reference to FIG. 4, with gate 3b and weir gate 13a closed, control valves V1a and V1b are opened allowing the water from the passageway A to flow into the passageway B. As passageway A is being drained, empty semi-buoyant cage 21a descends while at the same time the water level in passageway B is raised causing semi-buoyant cage 21b containing fish to be elevated. Meanwhile gate 4a is closed trapping fish in area 16a preparatory to the loading of cage 21a when cage is in the proper position.

As the volume and the pressure of water in passageway A is not sufficient to completely fill passageway B, water from an external pressure source must be employed. With reference to FIG. 5, valve V1a is closed and valves V3a and V3 are opened to complete the draining of passageway A. Valve V1, located on an external pressure source, is opened allowing water under pressure to flow through valve V1b and into passageway B to completely fill this passage thereby causing the semi-buoyant cage 21b to rise up the passage into area 14b. Meanwhile, gate 5a is closed trapping fish in area 17a in preparation to positioning cage device 21a.

With reference to FIG. 6, when cage 21b is properly positioned in area 14b, valves V1 and V1b are closed to maintain the water level in area 14b and passageway B. Weir gate 13b is opened allowing the fish to escape into area 12b. Weir gate 11b is then opened permitting the fish into area 10b and thence by further fishways, if necessary, directing the fish back into the main channel of the stream at the upper level of the obstacle. Valves V3a and V3 are closed and valve V2a opened to complete the draining of passageway A and well 15a. Cage device 21a settles into the well 15a as the water level drops locating the cage in position ready to accept a further charge of fish.

By proper sequential operation of the control valves and the various gates in the system, the procedure may be repeated raising cage 21a with combined fish while at the same time lowering cage 21b. It is also obvious from the above description that the operation of the system may be reversed and by proper control of the various gates and valves, the fish may be brought from the upper level to the lower level. A screen or stop device similar to the screen 26 described in conjunction with FIG. 2 may be employed to correctly position the cage device on its descent in order to align the cage for discharging the fish into area 16a or 16b through gate 3a or 3b respectively.

The water discharged through valving arrangements V2a, V3a, V2 and V3 may be put to any useful work, i.e. it may be combined with the main flow for driving a turbine or if the volume is not sufficient, it may be drawn off and discharged into the river.

The system outline, because of its generally vertical rise may be installed in close proximity to the obstruction in the river and does not require the long gradual slope associated with fish ladders. Because of the buoyancy of the cage device, the fish being conveyed are always safely near the surface of the level of water in the passageway and are not subjected to any undue pressures. The system may be installed to overcome obstructions such as dams regardless of the height involved.

I claim:

1. The method of assisting fish to circumnavigate an obstacle in a river comprising diverting the fish from the main channel of the river into a holding area, closing off the holding area from the main channel, lowering the water level in said holding area thereby forcing the fish to enter a loading area whereby they become confined in a semi-buoyant cage device, said cage device located within a generally vertical passageway and positioned at a level lower than said loading area, altering the water level within said passageway thereby raising or lowering the cage, permitting the fish to escape into a holding area at the new level and allowing the fish to reenter the main channel of the river.

2. The method of conveying live fish past an obstacle in a river comprising diverting the fish from the main channel of the river into a holding area, closing off the holding area from the main channel, lowering the water level in said holding area thereby forcing fish to enter a loading area wherein a semi-buoyant cage device is located within a generally vertical passageway and positioned at a level lower than said loading area, confining the fish within said cage device, altering the water level within said passageway thereby raising or lowering the cage, permitting the fish to escape said cage device to a holding area at the new level and directing the fish back into the main channel of the river.

3. The method of assisting fish to circumnavigate an obstacle in a river comprising diverting the fish from the main channel of the river into a holding area, closing off the holding area from the river, lowering the water level in said holding area thereby forcing the fish to enter a loading area containing a partially submerged cage device positioned at a level lower than said loading area within a generally vertical passageway and confining the fish into said cage, discharging water from the bottom of said passageway thereby lowering the water level and causing said cage with confined fish to descend, stopping the discharge of water thereby stopping the descent of said cage at an appropriate level, allowing the fish to escape the confines of the cage and directing the fish back to the main channel of the river.

4. The method as claimed in claim 3 which comprises a dual system in which as one cage is lowered within a passageway, a second cage located within a second parallel passageway is elevated.

5. The method of assisting fish to overcome an obstacle in a river comprising diverting the fish from the main channel of the river into a holding area, closing off said holding area from the river, lowering the water level in said holding area thereby forcing the fish to enter a loading well containing a partially buoyant cage device positioned at a level below said holding area and within a generally vertical passageway confining the fish in said cage, closing off said loading well and filling said passageway with water thereby causing said cage device containing the fish to be elevated, stopping the ascent of the cage at the appropriate level by shutting off the water supply to said passageway, allowing the fish to escape the confines of the cage and directing the fish back to the main channel of the river.

6. Apparatus for assisting live fish to circumnavigate an obstruction in a river comprising means for directing fish from a lower main stream into a gate system holding area; gate means for closing said area from said river, a second gate means for lowering the water level in said holding area thereby forcing fish into a generally vertical passageway, a partially buoyant cage means within said passageway for confining the fish, said cage means being positioned at a level below said holding area, control valve means to fill said passageway with water thereby raising said cage to the top of said passageway, gate system means at top of said passageway to allow fish into a second holding area and means to allow the fish reentry to the stream at the upper level.

7. The apparatus as claimed in claim 6 wherein the cage means comprises a screen, vertical rods extending upwardly from said screen and buoyant means attached to said rods to maintain the cage in a partially buoyant position.

8. Apparatus for assisting live fish to circumnavigate an obstruction in a river comprising means for diverting fish from an upper main stream into a gate system holding area, gate means for closing said area from said main stream, a second gate means for lowering the water level in said holding area thereby forcing the fish into a loading area, a partially submerged cage means for confining the fish positioned in a generally vertical passageway connected with said lower area and at a level below that of said loading area, control valve means to discharge water from said passageway thereby lowering said cage to the bottom of said passageway, gate system means at bottom of said passageway to allow fish into a second holding area and means to allow the fish reentry to the stream at the lower level.

9. The apparatus as claimed in claim 8 wherein the cage means comprises a screen, vertical rods extending upwardly from said screen and buoyant means attached to said rods to maintain the cage in a partially buoyant position.

10. Apparatus for assisting a live fish to circumnavigate an obstruction in a river comprising two substantially vertical passageways associated with the obstruction and interconnected at their lower ends by a valve system, a partially buoyant cage device located within each of said passageways for transporting the fish, gated system holding areas located at the top and lower levels of each of said passageways, said gated system having at least a first gate means for closing said areas and a second gate means defining a loading area, one of said passageways being filled with water with its associated cage device located near the top thereof and in communication with the upper loading area through said second gate means, the other of said passageways being substantially devoid of water with its associated cage device located near the bottom thereof and in communication with the lower loading area through said second gate means, said valve system having valve means to either interconnect said passageways or to drain or fill either of said passageways independently whereby said cage device containing the fish is raised or lowered.

11. The apparatus as defined by claim 10 wherein the valve system is manually, pneumatically or electrically operated.

12. The apparatus as defined by claim 11 whereby the valve system is adjusted to provide water for one of said passageways with the water discharged from the other of said passageways.

References Cited

UNITED STATES PATENTS 1,591,450   7/1926   Wheeler _____ 61—21

DAVID J. WILLIAMOWSKY, *Primary Examiner.*

PETER M. CAUN, *Examiner.*